Patented Feb. 28, 1939

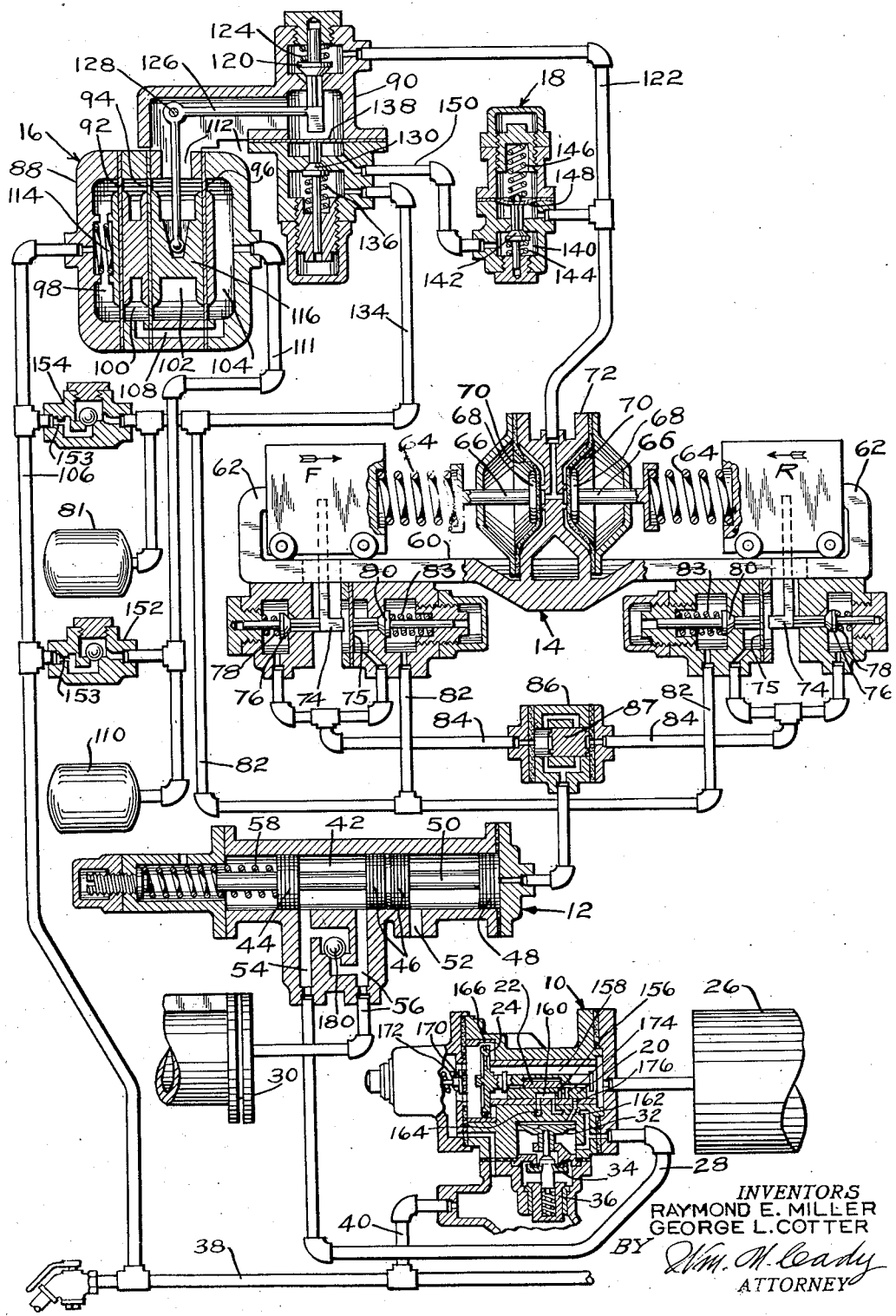

2,148,769

UNITED STATES PATENT OFFICE 2,148,769

INERTIA CONTROLLED BRAKE

Raymond E. Miller, Wilkinsburg, and George L. Cotter, Forest Hills, Pa., assignors to The Westinghouse Air Brake Company, Wilmerding, Pa., a corporation of Pennsylvania Application January 23, 1934, Serial No. 707,916
Renewed April 30, 1936

17 Claims. (Cl. 303—24)

This invention relates to an inertia controlled brake for railway trains, and more particularly to a pneumatically operated, inertia controlled, brake equipment for controlling independently the rate of retardation of each unit in a multiple unit train.

In railway trains equipped with the usual type of pneumatically operated brakes, an application of the brakes is effected by a reduction of the pressure in the brake pipe. When the brake pipe pressure is reduced, the triple valve on each unit in the train operates to supply air to the brake cylinders and thus apply the brakes. The triple valve on each unit in the train operates to supply air to the brake cylinders according to the reduction in the brake pipe pressure, and it will therefore be obvious that the brakes may not be applied alike, nor will they produce the same braking effect, on each unit in the train, because each unit may be loaded differently, there may be differences in brake cylinder piston travel between the several units, the brake shoe friction may not be the same for all of the units, the rate of leakage, if any, of pipes, brake cylinders, and other parts of the equipment may differ between the units, and because of other well known differences that may exist in the equipment between the several units. Because of these differences, some of the units in the train will tend to decelerate at a rate different from that of some of the other units.

It is a principal object of our invention to provide a brake equipment which is adapted to operate in connection with the usual brake equipment supplied for each unit in the train, and which is responsive to reductions in brake pipe pressure to so control the application of the brakes as to cause each unit in the train to decelerate at substantially the same rate, regardless of such differences in equipment as aforementioned.

Another object of our invention is to provide a pneumatically controlled, retardation controlling apparatus which effects and maintains a rate of retardation in accordance with the reduction in brake pipe pressure.

Another object is to provide a retardation controller apparatus of this character in which, although the rate of retardation is controlled in accordance with the reduction in brake pipe pressure, the brakes may be released at any time by moving the brake valve handle to release position in the usual manner.

Other important objects and advantages will be apparent from the following description, which we have illustrated by one embodiment in the single figure of the attached drawing.

Referring to this drawing, we have for this embodiment selected apparatus comprising a triple valve device 10, a brake cylinder pressure control valve device 12, an inertia governor 14, a retardation regulator device 16, and a pressure limiting valve device 18.

The triple valve device 10 may be of any of the well known types, and we have as one example shown a quick action type, comprising a slide valve 20 and a graduating valve 22, both adapted to be operated by a main piston 24, to control the supply of fluid under pressure from an auxiliary reservoir 26 to a pipe 28 leading to a brake cylinder 30, by way of the brake cylinder pressure controlling valve device 12. The triple valve device is also provided with the usual emergency piston 32, operatively associated with an emergency valve 34, which in connection with a check valve 36 operates in the well known manner to produce the quick action when an emergency application of the brakes is desired. The triple valve device is connected to the brake pipe 38 by the branch pipe 40 in the usual manner.

The brake cylinder pressure control valve device 12 comprises a casing defining a chamber 42 in which is disposed a plurality of pistons 44, 46 and 48, secured to a piston rod 50. The chamber 42 is in constant communication with the atmosphere by way of passage 52, and is also in constant communication with the triple valve device 10 by way of passage 54 and pipe 28, and with the brake cylinder 30 by way of pipe and passage 56.

The pistons 44, 46 and 48 are so disposed with relation to each other on the piston rod 50, that when urged to a biased position by a spring 58 the triple valve device 10 is connected directly to the brake cylinder 30. When fluid under pressure is supplied to the chamber 42 to the right of the piston 48, the piston rod 50, and hence the pistons secured thereto, will be moved to different positions, depending upon the pressure supplied to the chamber, to effect either a lapping or a release of the fluid supplied to the brake cylinder, as will hereinafter more fully appear.

The inertia governor 14 is provided with two bodies F and R, each of which has wheels adapted to permit the bodies to be rolled along a trackway 60. The bodies are normally urged against stops 62 by springs 64 held in the end of piston rods 66 associated with pistons 68 adapted to be operated by flexible diaphragms 70 mounted in cylinders 72.

The bodies F and R are adapted to be moved by force of inertia, as when the speed of the vehicle is changed. The body F is intended to be moved when the vehicle is traveling in one direction, and the body R is intended to be moved when the body is traveling in an opposite direction.

When fluid under pressure is supplied to the cylinders 72, to one side of the diaphragm 70, the springs 64 are compressed, and it will therefore require a greater force of inertia to move either of the bodies. As will hereinafter more fully appear, fluid under pressure is supplied to the cylinders 72 to effect control of the rate of retardation of the vehicle.

Each of the bodies F and R is provided with a downwardly extending arm 74, which acts to unseat a release valve 76 when the body is forced against stop 62. When either of the bodies moves away from its stop, movement of the arm 74 therewith permits the release valve 76 to be seated by a spring 78, and when the release valve has been seated the arm 74 presses against the stem of a supply valve 80 through a diaphragm 75 to unseat the valve, to permit fluid under pressure to flow from an auxiliary control reservoir 81 to one side of the piston 48 in the chamber 42 of the brake cylinder pressure control valve device 12, by way of pipes 82 and 84 and a double check valve 86. When the vehicle is traveling in either a forward or reverse direction only one of the bodies is active at a time in controlling the supply of fluid under pressure to operate the brake cylinder pressure control valve device 12. The double check valve device 86 operates to cut out one set of supply and release valves when the other set is operated.

The retardation regulator device 16 comprises a diaphragm portion 88 and a valve portion 90. The diaphragm portion 88 is provided with diaphragms 92, 94 and 96 defining chambers 98, 100, 102 and 104.

The chamber 98 is in constant communication with the brake pipe 38 by pipe 106. The chambers 100 and 104 are connected by a passage 108, and are both thereby in constant communication with an emergency reservoir 110 by a pipe 111, and are consequently at a pressure corresponding to the pressure of this reservoir.

The chamber 102 is in constant communication with the atmosphere by way of openings 112. A spring 114 acting upon a body 116 connected to all of the diaphragms 92, 94 and 96 serves to retain the diaphragms in balanced position so long as the brake pipe pressure and that of the emergency reservoir 110 are normal, or at predetermined values.

The valve portion 90 of the retardation regulator device 16 is provided with a release valve 120 adapted to control the release of fluid pressure from the cylinders 72 associated with the inertia governor 14, by way of pipe 122 and opening 112. The release valve 120 is urged toward seated position by a spring 124, but is held in unseated position by a bell crank lever 126, which is pivotally mounted at 128, so long as the diaphragms 92, 94 and 96 remain in balanced position.

The valve portion 90 is also provided with a supply valve 130 adapted to control the supply of fluid under pressure from the auxiliary control reservoir 81 to the cylinders 72, by way of pipes 134 and 150 and the pressure limiting valve device 18. The supply valve 130 is urged toward seated position by a spring 136, and to unseated position by movement of the bell crank lever 126 acting through a pressure tight diaphragm 138 when an unbalance occurs between the pressure in chamber 98 and that in chambers 100 and 104, as will hereinafter more fully be described.

The pressure limiting device 18 comprises a casing defining a chamber 140 in which is disposed a valve 142 urged toward seated position by a spring 144, but which is held in unseated position by a heavier spring 146 which overbalances the pressure exerted by the spring 144. A diaphragm 148 is interposed between the spring 146 and the stem to which the valve 142 is secured, and the chamber formed thereby is connected to the cylinders 72 by the aforementioned pipe 122. The chamber 144 is connected to the valve portion 90, of the retardation regulating device, by pipe 150. The pressure limiting valve device 18 acts to limit the pressure supplied to the cylinders 72 by the retardation regulator device 16.

Pressure in the emergency reservoir 110 and the auxiliary control reservoir 81 may be maintained by supply from the brake pipe 38, by way of pipe 106 and ball check valves 152 and 154, respectively, each of which is provided with a choke 153 for preventing large fluctuations in brake pipe pressure due to variations in pressure in the reservoirs. Pressure in the auxiliary reservoir 26 is maintained by recharging from the brake pipe through the triple valve device 10 in the usual manner.

In operation, when the vehicle is running, pressure in the brake pipe 38 is maintained at its normal value, whereupon the triple valve main piston 24 is in release position, as shown, and the pressure in the chamber 98 balances the pressure in the chamber 104, whereupon the diaphragms 92, 94 and 96 are in balanced position. The supply valve 130 of the valve portion 90 will, therefore, be in seated position, and the release valve 120 in unseated position.

Assuming now that the vehicle is traveling in a forward direction, so that the body F will be effective in controlling the brakes, and that the vehicle is traveling on a level track at a substantially constant rate of speed, so that the body F is positioned against its stop 62, the supply of fluid under pressure to the chamber 42 of the brake cylinder pressure control valve device 12 will be cut off and the pistons in the chamber 42 will be so positioned that the triple valve device 10 is connected directly to the brake cylinder 30 by way of the passages 56 and 54, as shown in the drawing.

If now it is desired to effect a service application of the brakes, the pressure in the brake pipe 38 is reduced an amount in accordance with the desired rate of retardation. This reduction may be accomplished in any of the usual ways, as for example, by operation of the usual brake valve device at the head end of the train. When a reduction in brake pipe pressure is effected, the triple valve device 10 will operate in the usual manner to cut off the venting of the brake cylinder and to effect a supply of fluid under pressure thereto from the auxiliary reservoir 26.

This is accomplished by movement of the main piston 24 to the left to application position, due to the pressure on one side of the piston from the auxiliary reservoir overbalancing that on the other side from the brake pipe, which has now been reduced. When the main piston 24 moves to the left it first moves the graduating valve 22 to bring port 156 into communication with chamber 158, which is in direct communication with the auxiliary reservoir 26.

Further movement of the main piston 24 to the left moves the slide valve 20 so that cavity 160 in the slide valve moves out of registration with the passage 162 leading to the brake cylinder, thereby cutting off communication through which fluid is released from the brake cylinder, and brings the port 156 into communication with the brake cylinder passage 162. Fluid under pressure will then flow from the chamber 158 and auxiliary reservoir 26 to the brake cylinder by way of passage 162, pipe 28, passage 54 in the brake cylinder pressure control valve device, and pipe and passage 56. When the main piston 24 moves to the left the feed groove 166 is closed so that the piston remains in application position.

At the same time the triple valve device operates, the reduction in brake pipe pressure effects an unbalancing of the pressures in chambers 98 and 104 of the retardation regulator device 16, causing the diaphragms 92, 94 and 96 to be unbalanced to the left. This unbalancing of the diaphragms causes the body 116 to rotate the bell crank lever 126 in a clockwise direction. This movement of the bell crank lever permits the release valve 120 to be seated by the spring 124, and if the movement of the lever is great enough the supply valve 130 will be unseated thereby.

Fluid under pressure will, therefore, flow from the auxiliary control reservoir 81 to the cylinders 72 by way of pipe 134, past the unseated valve 130, pipe 150, past the unseated valve 142 of the pressure limiting valve device 18, and pipe 122.

Pressure in the cylinders 72 will act upon the diaphragms 70 to compress the springs 64 against the bodies F and R. Since the vehicle is assumed to be traveling in a forward direction the effect upon body F need only be considered, as the force of inertia acting upon the body R, due to deceleration of the speed of the vehicle, will act only to urge the body R against its stop 62.

With the brakes applied, the vehicle begins to decelerate and when a rate of retardation has been reached at which the force of inertia acting upon the body F is sufficient to overcome the force exerted by the spring 64, the body F will move to the right against opposition of the spring. As the body F moves its arm 74 will move therewith, permitting the release valve 76 to be seated by the spring 78. Venting of the chamber 42 of the brake cylinder pressure control valve device 12 thereby will be cut off.

Further movement of the body F will bring the arm 74 into contact with the diaphragm 75 and unseat the supply valve 80 against resistance of spring 83. Fluid under pressure will, therefore, flow from the auxiliary control reservoir 81 to the chamber 42 to one side of the piston 48, by way of pipe 82, past the unseated valve 80, pipe 84, and through the double check valve 86, the pressure moving the piston valve 87 in the double check valve to the right, thus closing off the supply and release valves operated by the body R.

With pressure supplied to the chamber 42 the pistons secured to the piston rod 50 will be moved to the left. Movement of the pistons 46 will first act to close off the passage 56, and thus cut off the supply of fluid under pressure from the triple valve device to the brake cylinder.

If the rate of retardation is such that the body F continues to hold the supply valve 80 unseated, the pressure will continue to build up in the chamber 42 to one side of the piston 48, compressing spring 58 until the pistons 46 have been moved far enough to the left to bring the pipe and passage 56, leading to the brake cylinder, into communication with the exhaust passage 52, whereupon fluid pressure in the brake cylinder will be released to the atmosphere.

With release of pressure from the brake cylinder the rate of retardation will diminish, and the body F will move to the left. When it has moved far enough the supply valve 80 will close and thus cut off further supply of fluid under pressure to the chamber 42. With further release of fluid pressure from the brake cylinder to the atmosphere, the rate of retardation will further decrease so that the body F moves still further to the left, thereby unseating the release valve 76. Fluid pressure in the chamber 42 will thereupon be released to the atmosphere, and the pistons 46 will move to the right to cut off further release of fluid pressure from the brake cylinder.

As the vehicle continues to decelerate, the coefficient of friction between the rubbing parts of the brakes will increase, so that the rate of retardation also increases. The body F will then again move to the right cutting off the release of the fluid pressure from the chamber 42 and, if necessary, unseating the supply valve 80 to supply fluid pressure to the chamber 42 again.

It will thus be seen that the body F will move backward and forward against pressure of the spring 64, according to the rate of retardation, to intermittently supply fluid under pressure to and release it from the chamber 42, to maintain a rate of retardation corresponding to that at which the force of inertia acting upon the body F is balanced by the opposing force of the spring 64.

If the reduction in brake pipe pressure is small, the unbalancing of the diaphragms 92, 94 and 96 will be correspondingly small, so that the valve 130 will be unseated only a small amount. The rate at which the fluid is supplied to the cylinders 72 will, therefore, be low, and the initial opposition of the spring 64 correspondingly small, so that the body F will initially move to the right under a force of inertia corresponding to a low rate of retardation.

If the reduction in brake pipe pressure is relatively great, the rate at which fluid is supplied to the cylinders 72 will be correspondingly great, and the initial opposition of the spring 64 likewise greater, so that a high rate of retardation is required to effect an initial movement of the body F to the right. It will, therefore, be obvious that the supply of fluid under pressure to the brake cylinder will be so controlled as to produce a rate of retardation in accordance with the reduction in brake pipe pressure.

As the vehicle nears a stop, fluid may be supplied in the usual manner to the brake pipe to raise its pressure, and correspondingly effect a lower rate of retardation, so that the vehicle may be brought to a stop smoothly and without shock.

When the brake pipe pressure is built up, the pressure in chamber 98 of the retardation regulator device 16 is correspondingly increased, so that the diaphragms return to a balanced position. At the same time, the triple valve piston 24 moves to release position. It will be seen, therefore, that both the triple valve device and the retardation regulator device are responsive to brake pipe pressure, but while the former acts to initiate an application of the brakes, the latter acts to control the application to produce a desired rate of retardation.

It is desirable that the pressure delivered to the cylinders 72 be limited, so that the spring 64 will not be compressed to the point where a higher rate of retardation will be required to cause movement of the body than that which can be attained in practice. For this purpose, the pressure limiting valve device 18 has been provided.

As the pressure builds up in the cylinders 72, a point will be reached where the pressure reacting on the diaphragm 148, of the valve device 18, overbalances the deflecting force due to the spring 146, and the spring is thus compressed, permitting the valve 142 to be seated by its seating spring 144. This automatic seating of the valve 142 may be caused to take place at a pressure in the cylinders 72 corresponding to the maximum practical rate of retardation, such as that used in emergency applications of the brakes.

When it is desired to effect an emergency application of the brakes, the brake pipe pressure is reduced to zero, whereupon the main piston 24, of the triple valve device, is moved to emergency position to the left, where it engages a graduating stem, 170, compressing graduating spring 172. This movement of the piston moves the slide valve 20 far enough to the left to bring port 174 in the slide valve into registration with the brake cylinder passage 162, and to connect the valve chamber 158 directly to passage 176 leading to the chamber containing the emergency piston 32. Pressure in this chamber moves the emergency piston 32 downwardly to unseat the emergency valve 34.

Fluid under pressure in the chamber beneath the valve 34 then flows to the passage leading to pipe 28, and the pressure in the chamber beneath the check valve 36 unseats the check valve, permitting brake pipe pressure to flow to the brake cylinder pipe 28, past the unseated check valve and unseated emergency valve. This effects the quick action operation of the triple valve to cause a quick application of the brakes, which is a well known feature of this type of valve device.

At the same time the triple valve device effects an emergency application of the brakes, the diaphragms in the retardation regulator device 16 are deflected to their maximum unbalanced position to the left, whereupon the valve 130 is opened wide to permit fluid under pressure to flow to the cylinders 72 at a maximum rate. As soon as this pressure has reached a value which will cause the pressure limiting valve device 18 to cut off further supply, the spring 64 will be compressed a maximum amount. The inertia governor 14 will thereafter control the brake cylinder pressure, through operation of the brake cylinder pressure regulating valve device 12, to produce the maximum rate of retardation.

Although the retardation regulator device 16 cooperates with the inertia governor 14 to release the brakes in accordance with the increase of the brake pipe pressure, it is desirable that the engineman be able to release the brakes at any time independently of the retardation regulator device, particularly should the retardation regulator device, or the inertia governor, fail to function. In order to provide for this, we have disposed a ball check valve 180 between the passages 54 and 56 of the brake cylinder pressure regulating device 12. This ball check valve will remain seated so long as the pressure flowing to the brake cylinder from the triple valve device exceeds or is equal to that in the brake cylinder.

When the brake pipe pressure is recharged to normal, the main piston 24 of the triple valve device moves to release position, whereupon fluid pressure in the brake cylinder is normally released to the atmosphere, by virtue of the cavity 160 connecting the exhaust passage 164 with the brake cylinder passage 162. If now at this time the pistons 46 of the brake cylinder pressure control valve device 12 should have closed off the passage 56, the release of pressure in the pipe 28, through operation of the triple valve device, will cause the ball check valve 180 to be unseated by the pressure in the brake cylinder, and thus release the brake cylinder pressure to the atmosphere by way of the triple valve device.

While we have described one embodiment of our invention in connection with a quick action type triple valve device, we do not intend to be limited to this specific valve device, or to the other apparatus as specifically illustrated in this embodiment, nor is it our intention to limit the scope of this or other embodiments otherwise than by the terms of the appended claims.

Having now described our invention, what we claim as new and desire to secure by Letters Patent, is:

1. In a vehicle brake apparatus, the combination with a brake cylinder, of a triple valve device operated upon a reduction in brake pipe pressure for controlling the supply of fluid under pressure to and its release from said brake cylinder, means including an inertia governor for also controlling the supply of fluid under pressure to and its release from said brake cylinder, and a retardation regulator device also operable upon a reduction in brake pipe pressure for controlling said governor device.

2. In a vehicle brake apparatus, the combination with a brake cylinder, of a triple valve device operable upon a reduction in brake pipe pressure for controlling the supply of fluid under pressure to and its release from said brake cylinder, a pressure controlling valve device for also controlling the supply of fluid under pressure to and its release from said brake cylinder, an inertia governor for controlling said pressure controlling device, and a retardation regulator device also operable upon a reduction in brake pipe pressure for controlling said inertia governor device.

3. In a vehicle brake apparatus, the combination with a brake cylinder, of a triple valve device operable upon a reduction in brake pipe pressure for controlling the supply of fluid under pressure to and its release from said brake cylinder, a pressure controlling valve device for also controlling the supply of fluid under pressure to and its release from said brake cylinder, an inertia governor device operable upon a change in speed in either direction of travel of the vehicle for controlling said last mentioned valve device, and a retardation regulator device also operable upon a reduction in brake pipe pressure for controlling said inertia governor device.

4. In a vehicle brake apparatus, the combination with a brake cylinder, of a triple valve device for controlling fluid under pressure provided for supply to said brake cylinder, valve means having cut off, lap, and release positions for also controlling in series with said triple valve device fluid supplied to said brake cylinder, and means whereby fluid pressure in said brake cylinder may be released to the atmosphere independently of and when said valve means is in lap position.

5. In a fluid pressure brake apparatus, a regulating device comprising a casing, spaced flexible diaphragms within said casing defining pressure chambers, said diaphragms being adapted to be unflexed when the pressures in said chambers are maintained at predetermined values and to be flexed when the pressure in one of said chambers falls below a predetermined value, a valve device for controlling the supply of fluid under pressure to and its release from fluid pressure operated devices, and means whereby when said diaphragms are unflexed said valve device is operated to cut off said supply and when said diaphragms are flexed said valve device is operated to effect said supply.

6. In a vehicle brake apparatus, the combination with a brake cylinder and a brake pipe, of a triple valve device operated upon a reduction in brake pipe pressure for effecting a supply of fluid under pressure to said brake cylinder, a valve device operable to cut off the supply of fluid to said brake cylinder, said last valve device being operated by a supply of fluid under pressure thereto, a normally seated valve adapted when unseated to effect a supply of fluid under pressure to operate said valve device, an inertia governor operated according to the rate of retardation of the vehicle for effecting unseating of said valve, fluid pressure means for varying the rate of retardation at which said governor effects unseating of said valve, and means operative to supply fluid under pressure to said fluid pressure means to a degree in accordance with the degree of reduction of brake pipe pressure when effecting an application of the brakes.

7. In a vehicle brake apparatus, the combination with a brake pipe and a brake cylinder, of a triple valve device operated upon a reduction in brake pipe pressure for effecting a supply of fluid under pressure to said brake cylinder, a controlling valve device operable to cut off the supply of fluid under pressure from said triple valve device to said brake cylinder and also operable to release pressure from said brake cylinder, said controlling valve device being operated by a supply of fluid under pressure thereto, an inertia governor device having a body movable according to the rate of retardation of the vehicle, said body having a biased position, a release valve adapted to release fluid under pressure supplied to operate said controlling valve device and normally held in releasing position by said governor body when in said biased position, a supply valve for controlling the supply of fluid under pressure to operate said controlling valve device and adapted to be operated to supply position upon movement of said governor body from said biased position after said release valve has been closed, a spring opposing movement of said governor body, a cylinder having a piston therein operable to increase the tension on said spring, and means for supplying fluid under pressure to said cylinder in accordance with reductions in brake pipe pressure when effecting an application of the brakes.

8. In a vehicle brake apparatus, the combination of an inertia governor device having a body movable according to the rate of retardation of the vehicle, a spring opposing movement of said body, fluid pressure actuated means for increasing the tension on said spring, means for effecting a supply of fluid under pressure to said fluid pressure actuated means when effecting an application of the brakes, and a limiting valve device operated upon a predetermined pressure of fluid supplied to said fluid pressure actuated means for cutting off said supply.

9. In a vehicle brake apparatus, the combination with a brake pipe and a reservoir, of a control device having a casing and a diaphragm therein defining a brake pipe chamber connected to said brake pipe and a reservoir chamber connected to said reservoir, means establishing a communication between said chambers, a check valve in said communication adapted to permit the pressure in said brake pipe chamber to be reduced below the pressure in said reservoir chamber and operable to permit the flow of fluid under pressure from said brake pipe chamber to said reservoir chamber, a valve device, and means connecting said diaphragm to said valve device whereby when the pressure in said brake pipe chamber is reduced said diaphragm is flexed to effect operation of said valve device.

10. In a fluid pressure brake apparatus, in combination, a brake pipe, a reservoir, a casing, flexible diaphragms in spaced and opposing relation within said casing defining a plurality of chambers, one of said chambers being connected to said brake pipe and other of said chambers being connected to said reservoir, all of said diaphragms being adapted to be unflexed when the pressures in said chambers are maintained at predetermined values and all of said diaphragms being adapted to be flexed when the pressure in one of said chambers is diminished below a predetermined value, a valve device operable to control a supply of fluid under pressure effective in controlling an application of the brakes, and means connecting said diaphragm to said valve device and operable to effect operation of said valve device when all of said diaphragms are flexed.

11. In a vehicle brake system, in combination, fluid pressure brake means, a brake pipe, means operated upon a reduction in brake pipe pressure for effecting a supply of fluid under pressure to said fluid pressure brake means to effect an application thereof, a retardation controller device operated according to the rate of retardation of the vehicle, means responsive to operation of said retardation controller device for controlling the degree of fluid under pressure supplied to said fluid pressure brake means, and means responsive also to reduction in brake pipe pressure for adjusting said retardation controller device according to the degree of reduction in brake pipe pressure.

12. In a vehicle brake system, in combination, a brake cylinder, a valve device for controlling the supply of fluid under pressure to and its release from said brake cylinder, means including an inertia governor operated according to the rate of retardation of the vehicle for also controlling the supply of fluid under pressure to and its release from said brake cylinder, fluid pressure operated means for adjusting said inertia governor, regulating means for effecting and controlling fluid under pressure supplied to said adjusting means, and a valve device for limiting the pressure of fluid supplied to said adjusting means by said regulating means.

13. In a vehicle brake system, in combination, a brake cylinder, a brake pipe, means operated upon a reduction in brake pipe pressure for effecting a supply of fluid under pressure to said brake cylinder, a retardation controller device operated according to the rate of retardation of the vehicle, means responsive to operation of said retardation controller device at a chosen rate of retardation for effecting a release of fluid under pressure from said brake cylinder, fluid pressure controlled means for adjusting said retardation controller device, means also operated upon a reduction in brake pipe pressure for supplying fluid under pressure to said adjusting means, and a valve device for limiting the degree of pressure of fluid supplied to said adjusting means.

14. In a fluid pressure brake apparatus, in combination, a brake cylinder, two bodies each of which is movable in a direction opposite to the other according to the rate of retardation of the vehicle, one body only being movable for a given direction of travel, a common fluid pressure controlled means for opposing movement of each of said bodies according to the degree of fluid under pressure supplied to said common means, and means controlled by each of said bodies for controlling the supply of fluid under pressure to and its release from said brake cylinder.

15. A deceleration controller for fluid pressure brakes, comprising in combination, modulating valve means; an inertia mass for actuating said valve means; yielding means characterized by a resistance to displacement which increases with displacement, for resisting motion of said inertia mass; fluid pressure actuated means for variably stressing said yielding means; and valve means responsive to a definite pressure for controlling said fluid pressure actuated means.

16. In a braking system, the combination of power actuated braking means; a controller operable to produce service and emergency applications and release of said braking means; a modulating device responsive to the deceleration produced by a brake application and serving to modulate such application; and adjusting means for the modulating device actuated differently by said controller in producing service and emergency applications respectively.

17. In a vehicle brake system the combination of fluid pressure braking means; a brake pipe; means operated upon a reduction in brake pipe pressure for effecting a supply of fluid under pressure to effect an application of said fluid pressure braking means; means including an inertia governor for controlling the degree of application of said fluid pressure braking means, said inertia governor being unaffected by the said fluid pressure which effects an application of the braking means; and regulating means also operated upon a reduction in brake pipe pressure for controlling said inertia governor.

RAYMOND E. MILLER.
GEORGE L. COTTER.